United States Patent [19]

Miyazaki

[11] Patent Number: 5,732,329
[45] Date of Patent: Mar. 24, 1998

[54] RADIO TRANSMITTER/RECEIVER

[75] Inventor: Shinichi Miyazaki, Saitama, Japan

[73] Assignee: NEC Corporation, Tokyo, Japan

[21] Appl. No.: 660,889

[22] Filed: Jun. 10, 1996

[30] Foreign Application Priority Data

Jun. 20, 1995 [JP] Japan .................... 7-153170

[51] Int. Cl.⁶ .................................................. H04B 1/16
[52] U.S. Cl. .................................................. 455/76; 455/78
[58] Field of Search .................... 455/73, 75, 76, 455/77, 78, 80, 82, 83, 88, 575

[56] References Cited

U.S. PATENT DOCUMENTS

| | | | |
|---|---|---|---|
| 5,276,913 | 1/1994 | Lee et al. | 455/76 |
| 5,335,364 | 8/1994 | Heinonen | 455/76 |
| 5,499,392 | 3/1996 | Grunwell | 455/76 |

*Primary Examiner*—Amelia Au
*Attorney, Agent, or Firm*—Sughrue, Mion, Zinn, Macpeak & Seas, PLLC

[57] ABSTRACT

The present invention is a radio transmitter/receiver in which a receiving local oscillation means composed of a PLL including a dividing circuit is free from an erroneous operation due to an invasion of a transmitting signal and a suppression of power consumed is achieved. A frequency mixing circuit 3 receives a local oscillation signal S3 from a receiving local oscillation means 5 and converts a receiving signal S1 into an intermediate frequency signal. A transmitting section 6 output a transmitting signal S4 during talking. A transmitting detection circuit 7 detects the transmitting signal S4 to output a transmitting detection signal S5. An amplifying circuit 51 of receiving local oscillation means 5 is supplied with a current from a current source circuit 52 and amplifies the local oscillation signal S3. The current source circuit 52 increases the supply current upon the receipt of the transmitting detection signal S5 and increases the gain of the amplifying circuit 51. A rejection filter 86 is constituted such that the rejection filter 86 exhibits a low impedance for the frequency of the transmitting signal. A switch 53 is rendered to be in the ON state upon the receipt of the transmitting detection signal S5 so that the rejection filter 86 function to attenuate the transmitting signal which interferes into the dividing circuit.

3 Claims, 3 Drawing Sheets

RADIO TRANSMITTER/RECEIVER

BACKGROUND OF THE INVENTION

1. Field of the Invention

The present invention relates to a radio transmitter/receiver which performs transmitting and receiving operations simultaneously, more particularly to a radio transmitter/receiver which comprises receiving local oscillation means for producing a local oscillation signal, which constitutes a phase lock loop (PLL) including a dividing circuit to divide the local oscillation signal.

2. Description of the Related Art

FIG. 1 is a block diagram showing a constitution example of a conventional radio transmitter/receiver. It is noted that as such kind of a radio transmitter/receiver there is, for example, a portable telephone.

Here, a received signal S1 received through an antenna 1 and a transmitting/receiving filter 2 is mixed with a local oscillation signal S3 in a frequency mixing circuit 3, and is converted into an intermediate frequency signal. Thereafter, the intermediate frequency signal is amplified in an intermediate frequency circuit 4, and is output as the intermediate frequency signal S2. It is noted that the local oscillation signal S3 is produced by a receiving local oscillation means 8.

On the other hand, a transmitting signal S4 which is output from a transmitting section 6 during talking is transmitted through the transmitting/receiving filter 2 and the antenna 1. In a standby period, receiving only is performed. In talking period, receiving and transmitting operations are performed simultaneously.

The receiving local oscillation means 8 comprises a phase lock loop which is Composed of a voltage control oscillation circuit (VCO) 81 outputting the local oscillation signal S3, a dividing circuit 82 dividing the local oscillation signal S3, a reference frequency oscillation circuit 83 producing a reference signal, a phase comparison circuit 84 detecting the phase difference between a dividing output and the reference signal, a low pass filter 85 reducing a high frequency component, and a rejection filter 86.

Hereupon, when a high level transmitting signal interferes into a circuit of a receiving side during talking, a reduction in a receiving sensitivity and incorrect operation of the receiving local oscillation means are caused so that receiving function trouble is caused. To reduce the occurrence of such troubles the receiving side is shielded by the use of a metal plate having a shielding effect. To prevent the incorrect operation of the receiving local oscillation means 8, particularly, the rejection filter 86 are connected with an input side of the dividing circuit 82.

Specifically, when the transmitting signal interferes into the receiving local oscillation means 8 by spatial propagation, and it is input to the dividing circuit 82 with a small level difference from the local oscillation signal S3, the dividing circuit 82 will perform incorrect operation so that a normal local oscillation signal S3 is not produced. Particularly, in the equipment which fits an antenna directly to its body, the high level transmitting signal interferes thereinto. For this reason, the receiving local oscillation means 8 is designed such that by connecting the rejection filter 86 to the input side of the dividing circuit 82 the interfering transmitting signal is fully attenuated compared with the local oscillation signal S3.

The rejection filter 86 is constituted such that the filter 86 possesses the characteristic of being able to attenuate the transmitting signal due to low impedance for the frequency of the transmitting signal. Furthermore, because the frequency of the local oscillation signal S3 is close to that of the transmitting signal S4, the local oscillation signal S3 to be passed through is attenuated.

The foregoing conventional radio transmitter/receiver has a constitution such that the dividing circuit connects the rejection filter to its input side to attenuate the interferes transmitting signal, in order to keep the dividing circuit from performing incorrect operation by the transmitting signal which interferes into the receiving local oscillation means formed of the PLL including the dividing circuit.

This rejection filter, however, undesirably attenuates the local oscillation signal to be inherently passed through, whereby the level of the local oscillation signal which is input to the dividing circuit is reduced. Thus, the operation of the receiving local oscillation means is stable. To compensate the passing loss, when the level of the local oscillation signal is increased, the receiving local oscillation means normally operates also in standby period. Consumed power of the equipment increases. Particularly, for the portable telephone which operates with a small capacitance cell, an operation time is short.

SUMMARY OF THE INVENTION

The present invention was made considering the foregoing problems involved in the foregoing conventional prior arts, and the object of the present invention is to provide a radio transmitter/receiver which suppresses the power consumed to prevent incorrect operation caused when a transmitting signal interferes into a receiving local oscillation means constituted of a PLL which a dividing circuit.

The foregoing object is accomplished in one embodiment by providing a radio transmitter/receiver comprising transmitting means for outputting a transmitting signal during talking; frequency mixing means for normally receiving a receiving signal and a local oscillation signal to mix these signals and to output an intermediate frequency signal; receiving local oscillation means for constituting a phase locked loop (PLL) which includes a dividing circuit to divide the aforementioned local oscillation signal and for producing the aforementioned local oscillation signal; transmission detection means for detecting the aforementioned transmitting signal produced from an output side of the aforementioned transmitting means to transmit a detection signal; amplifying means which is disposed in the input side of the aforementioned dividing circuit, for amplifying the aforementioned local oscillation signal by increasing the gain thereof upon the receipt of the aforementioned detection signal; and filter means which is disposed in the input side of the aforementioned dividing circuit, for attenuating the frequency component of the aforementioned transmitting signal interfering into the aforementioned dividing circuit upon the receipt of the aforementioned detection signal.

In the foregoing constitution, the aforementioned amplifying means includes an amplifying circuit which changes the gain in accordance with a power source current and a current source circuit which increases the aforementioned power source current to be supplied to the aforementioned amplifying circuit upon the receipt of the aforementioned detection signal. The aforementioned filter means includes a rejection filter which exhibits a low impedance for the frequency of the aforementioned transmitting signal and a switch which is arranged between the rejection filter and the ground and operates upon the receipt of the aforementioned detection signal to make the aforementioned rejection filter function.

3

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENTS

An embodiment of a radio transmitting/receiver according to the present invention will now be described with reference to the accompanying drawings below.

Figure 1:
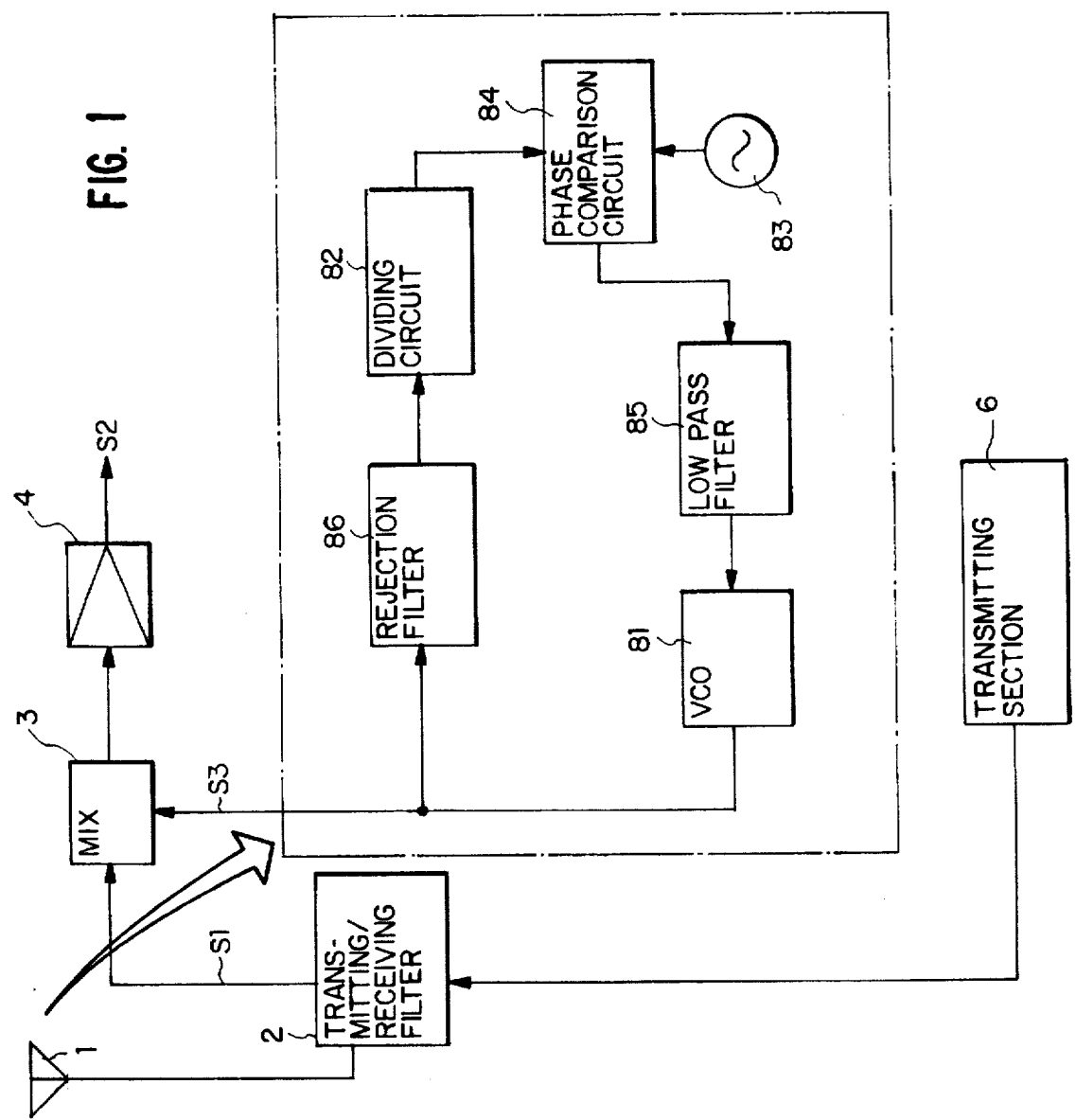
FIG. 1 is a block diagram showing an example of a conventional radio transmitter/receiver.
Figure 2:
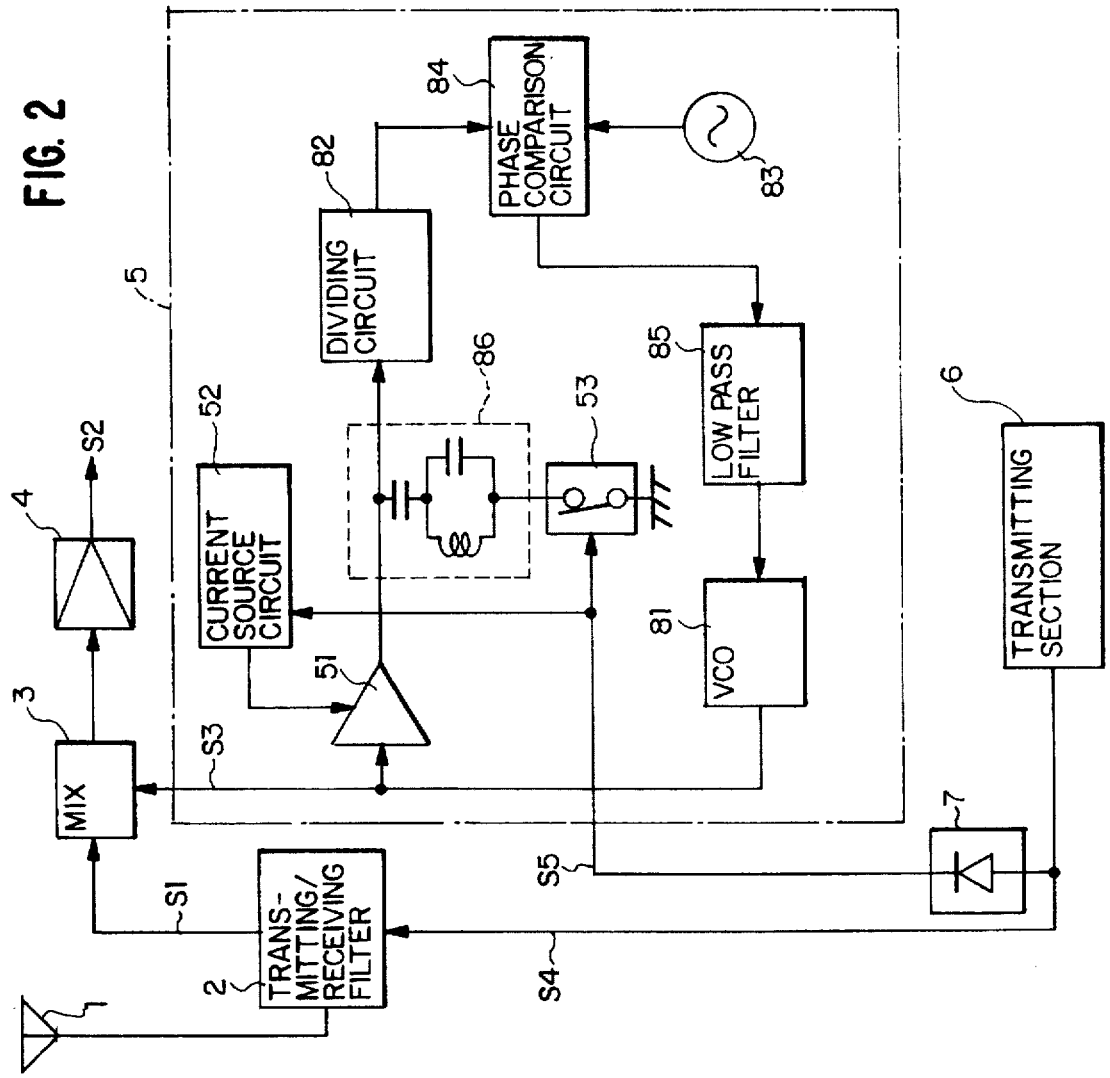
FIG. 2 is a block diagram showing an embodiment of a radio transmitter/receiver according to the present invention.
Figure 3:
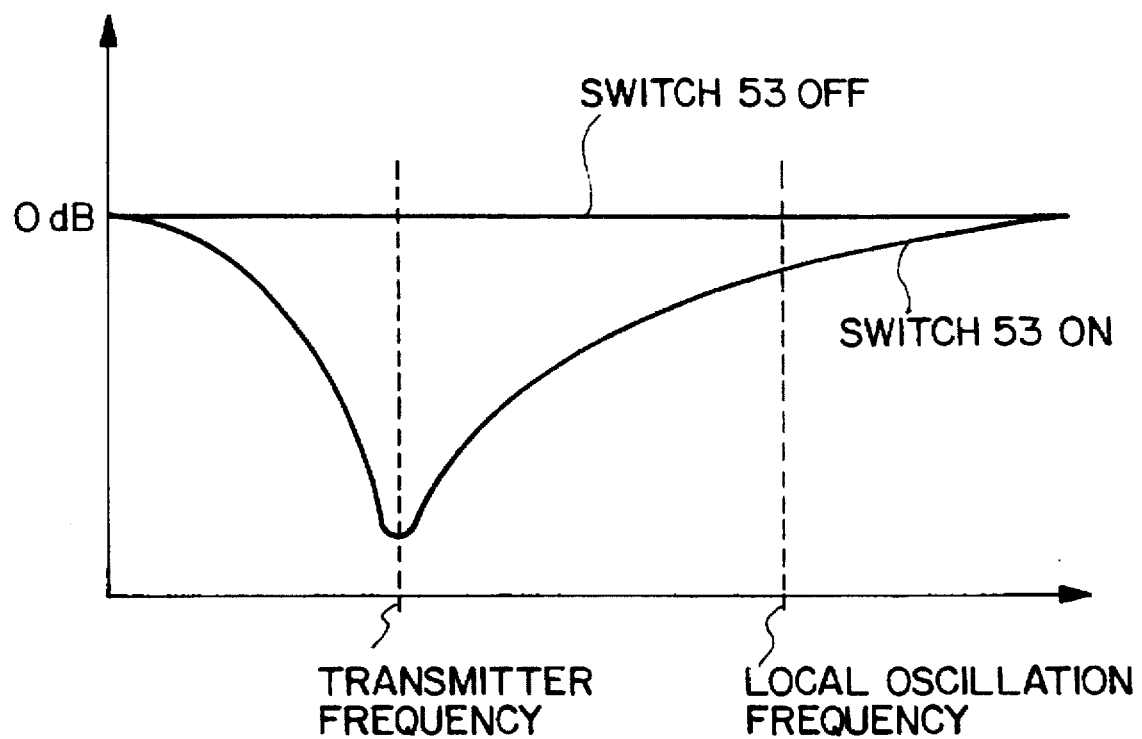
FIG. 3 is a diagram showing the characteristic of the rejection filter shown in FIG. 2.

FIG. 2 is a block diagram showing an embodiment of a radio transmitter/receiver according to the present invention. Reference is now made to the drawing, wherein like reference numerals designates corresponding parts throughout the view.

Referring now to FIG. 2, a receiving signal S1 received through an antenna 1 and a transmitting/receiving filter 2 is mixed with a local oscillation signal S3 in a frequency mixing circuit 3 and is converted to an intermediate frequency signal. Thereafter, the intermediate frequency signal is amplified in an intermediate frequency amplifying circuit 4 and is output as an intermediate frequency signal S2. It is noted that the local oscillation signal S3 is produced by receiving local oscillation means 5.

On the other hand, a transmitting signal S4 which is output from a transmitting section 6 during talking is transmitted through the transmitting/receiving filter 2 and the antenna 1. Furthermore, to detect the transmitting signal S4 a transmitting detection circuit 7 is connected with an output side of the transmitting section 6. When the transmitting signal S4 is output from the transmitting section 6, the transmitting detection circuit 7 detects the transmitting signal S4 and a transmitting detection signal S5 is output from the transmitting detection circuit 7.

Next, receiving local oscillation means 5 will be described.

Receiving local oscillation means 5 comprises a voltage control oscillation circuit (VCO) 81 which outputs the local oscillation signal S3, a dividing circuit 82 which divides the local oscillation signal S3, a reference frequency oscillation circuit 83 which produces a reference signal, a phase comparison circuit 84 which detects the phase difference between a divided output and the reference signal, a lowpass filter 85 which removes a high frequency component, and a rejection filter 86. These parts are the same as those of the conventional radio transmitter/receiver. The receiving local oscillation means 5 further comprises an amplifying circuit 51 which amplifies the local oscillation signal S3 to transmit the signal S3 to the dividing circuit 82, a current source circuit 52 which controls the power source current to be supplied to the amplifying circuit 51 in accordance with the transmitting detection signal S5, and a switch 53 which grounds the rejection filter 86 in accordance with the transmitting detection signal S5.

The current source circuit 52 increases the supply current to the amplifying circuit 51 when the current source circuit 52 receives the transmitting detection signal S5 from transmitting detection circuit 7, that is, the transmitting signal S4 is transmitted from the transmitting section 6 to the transmitting/receiving filter 2. The amplifying circuit 51 increases its gain as the supply current from the current source circuit 52 increases, and increases the level of the local oscillation signal which is output to the dividing circuit 82.

Furthermore, the switch 53 is rendered to be in the ON state only when the switch 53 receives the transmitting detection signal S5, that is, when the transmitting signal S4 is transmitted. With the ON state of the switch 53, one terminal of the rejection filter 86 is grounded so that the rejection filter 86 exhibits its function. The rejection filter 86 is composed of, for example, an LC resonance circuit, and the rejection circuit 86 is constituted so that the rejection circuit 86 exhibits a low impedance for the frequency of the transmitting signal to attenuate the transmitting signal.

Now, if the switch 53 is in the OFF state, the rejection filter 86 does not function. The signal passing through the rejection filter 86 is not attenuated. When the switch 53 is rendered to be in the ON state, the rejection filter 86 functions so that the interfering transmitting oscillation signal is also attenuated. However, at this time, the gain is increased by the amplifying circuit 51 so that the pass loss of the local oscillation signal is compensated.

Hereupon, only when the transmitting signal is being transmitted, the rejection filter 86 is made to function, and at the same time the current which is supplied to the amplifying circuit 51 from the current source circuit 52 is increased so that the gain of the amplifying circuit 51 is increased. Thus, the transmitting signal interfering into the receiving local oscillation means 5, and the pass loss of the local oscillation signal is compensated, so that the dividing circuit 82 operates stably. Furthermore, since the current supplied to the amplifying circuit 51 is increased only when the transmitting signal is being transmitted, and the amplifying circuit 51 normally operates with the current as little as possible, the power consumed can be suppressed.

As described above, according to the present invention, in a radio transmitter/receiver which comprises receiving local oscillation means for producing a local oscillation signal by constituting a phase lock loop (PLL) including a dividing circuit which divides the local oscillation signal, an amplifying circuit amplifying the local oscillation signal and a rejection filter attenuating an interfering transmitting signal are connected to an input side of the dividing circuit. Only when the transmitting signal is being transmitted, the rejection filter is operated and at the same time the current supplied to the amplifying circuit from a current source circuit is increased thereby increasing the gain of the amplifying circuit, whereby the pass loss of the local oscillation signal is compensated by the rejection filter and the transmitting signal is attenuated. Thus, the dividing circuit never performs an erroneous operation due to the invasion of the transmitting signal and the dividing circuit operates stably. Furthermore, since the current to the amplifying circuit is increased only when the transmitting signal being transmitted and the amplifying circuit operates with the current as little as possible, the power consumed can be suppressed.

It is to be understood that variations and modifications of RADIO TRNSMITTER/RECEIVER disclosed herein will be evident to those skilled in the art. It is intended that all such modifications and variations be included within the scope of the appended claims.

What is claimed is:

1. A radio transmitter/receiver comprising:

transmitting means for outputting a transmitting signal during talking;

frequency mixing means for normally receiving a receiving signal and a local oscillation signal to output an intermediate frequency signal;

receiving local oscillation means for producing said local oscillation signal, said receiving local oscillation means including a dividing circuit to divide said local oscillation signal and constituting a phase lock loop (PLL);

transmitting detection means for detecting said transmitting signal to transmit a detection signal, said transmitting detection means being disposed in an output side of said transmitting means;

amplifying means for increasing the gain thereof and amplifying said local oscillation signal upon the receipt of said detection signal, said amplifying circuit being disposed in the input side of said dividing circuit; and filter means for functioning upon the receipt of said detection signal and for attenuating the frequency component of said transmitting signal invading into the said dividing circuit, said filter means being disposed in the input side of said dividing circuit.

2. A radio transmitter/receiver according to claim 1, wherein said amplifying means comprises;

an amplifying circuit which changes its gain in accordance with a source current; and a current source circuit which increases said source current supplied to said amplifying circuit upon the receipt of said detection signal.

3. A radio transmitter/receiver according to claim 1, wherein said filter means comprises;

a rejection filter which exhibits a low impedance for the frequency of said transmitting signal; and a switch which operates upon the receipt of said detection signal to make said rejection filter function, said switch being disposed between said rejection filter and the ground.

* * * * *